United States Patent [19]

Brann et al.

[11] Patent Number: 4,643,079
[45] Date of Patent: Feb. 17, 1987

[54] IRON PISTON HAVING SELECTIVELY HARDENED RING GROOVE

[75] Inventors: David E. Brann, Lemont; James E. Lindsay, Warrenville, both of Ill.

[73] Assignee: General Motors Corporation, Detroit, Mich.

[21] Appl. No.: 716,873

[22] Filed: Mar. 28, 1985

[51] Int. Cl.⁴ .................................................. C21D 5/00
[52] U.S. Cl. .................................. 92/222; 123/193 P; 277/224; 277/DIG. 6; 148/152
[58] Field of Search ............... 123/193 P; 29/156.5 R; 277/229, DIG. 6; 148/35, 145, 152; 92/222

[56] References Cited

U.S. PATENT DOCUMENTS

| | | | |
|---|---|---|---|
| 2,500,566 | 3/1950 | Philipps | 148/152 X |
| 3,712,099 | 1/1973 | Elsbett et al. | 29/156.5 R |
| 3,837,934 | 9/1974 | Pfoffmann et al. | 148/152 X |
| 4,124,413 | 11/1978 | Komatsu et al. | 148/3 |
| 4,161,321 | 7/1979 | Hendrixon et al. | 277/DIG. 6 X |
| 4,336,077 | 6/1982 | Leach et al. | 29/156.5 R X |

FOREIGN PATENT DOCUMENTS

| | | | |
|---|---|---|---|
| 0154726 | 4/1982 | German Democratic Rep. | 123/193 P |
| 0106322 | 9/1978 | Japan | 148/152 |
| 2023764 | 1/1980 | United Kingdom | 123/193 P |

Primary Examiner—A. Michael Chambers
Assistant Examiner—John C. Fox
Attorney, Agent, or Firm—Douglas D. Fekete

[57] ABSTRACT

A cast iron piston characterized by a pearlitic matrix microstructure comprises a ring groove defined by opposed faces that are selectively hardened adjacent the piston side wall. The hardened surfaces are characterized by a martensitic matrix microstructure having a Knoop hardness of preferably at least 690. In a preferred embodiment, the groove faces are hardened by a stripe hardening process.

2 Claims, 5 Drawing Figures

IRON PISTON HAVING SELECTIVELY HARDENED RING GROOVE

This invention relates to a long-lasting cast iron piston for an internal combustion engine. More particularly, this invention relates to a diesel piston having a compression ring groove defined by hardened faces to reduce wear.

A piston for a diesel engine is provided with one or more narrow annular grooves for seating compression rings that seal against a surrounding cylinder wall. As the piston reciprocates, the groove faces wear, increasing the tendency of the ring to break and seriously damage the engine. For pistons formed of relatively soft aluminum, it is known to reduce groove wear by casting an insert of hard material into the aluminum piston body. Alternately, it has been proposed to suitably treat aluminum groove surfaces, for example, to form a wear-resistant alloy. However, a different situation exists for cast iron pistons. Despite a long felt need and the known hardenability of cast iron, the industry has not heretofore been successful in hardening the groove surfaces. We have found that traditional hardening practices have not been satisfactory for piston grooves. Techniques such as flame hardening heat a significant portion of the piston body, resulting in distortion. Recently developed irradiation techniques that employ laser or electron beams have also not been satisfactory because a beam intensity sufficient to heat gray iron to hardening temperatures, when directed at a ring groove, creates localized incipient melting near the piston circumference, resulting in an unwanted brittle phase. The groove is too narrow to receive an induction coil of a size effective to heat cast iron. As a result, the industry has had to resort to more cumbersome techniques such as selectively chromium plating groove surfaces to reduce wear in cast iron pistons.

Therefore, it is an object of this invention to provide a long-lasting cast iron piston for an internal combustion engine having a compression ring groove defined by opposite faces formed of cast iron that is selectively hardened to resist ring wear.

In a preferred embodiment, an extended life diesel piston of this invention is formed of a singular cast iron body and has an annular machined groove encircling the body for receiving a piston ring. The groove is defined by opposed, spaced faces that intersect the peripheral wall of the piston body. The bulk of the piston body is characterized by an as-cast pearlitic microstructure having a matrix Knoop hardness (HK) value of less than 320. In accordance with this invention, each groove face comprises a selectively hardened band adjacent the peripheral wall. A stripe hardening process is preferred for selectively hardening the groove face. The hardened band is characterized by a martensitic microstructure having a matrix Knoop hardness of at least 690 HK. When employed in an internal combustion engine, the hardened face of the cast iron piston resists wear by a ring seated within the groove. As a result, ring breakage is reduced, and the life of the piston in the engine is extended.

The present invention will be further illustrated with reference to the accompanying drawings wherein.

Figure 1:
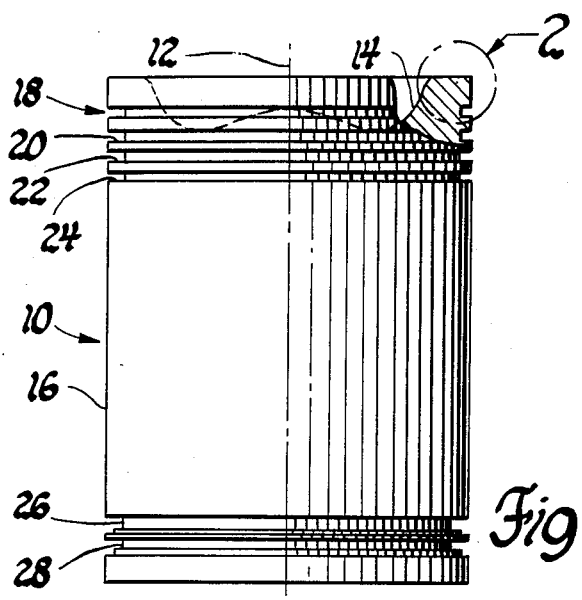
FIG. 1 is an elevational view, partially cut away, of a cast iron diesel piston in accordance with this invention.
Figure 2:
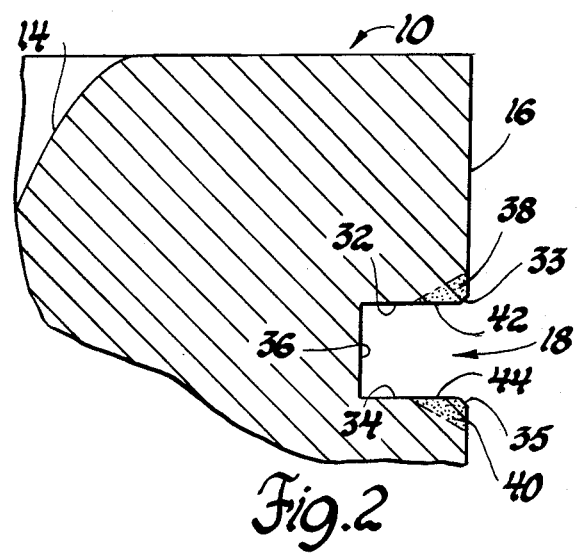
FIG. 2 is a cross-sectional view of a detail indicated by the circle in FIG. 1 showing a hardened ring groove in accordance with this invention.

In a preferred embodiment depicted in FIGS. 1 and 2, a groove hardened, cast iron diesel piston 10 of this invention is of a type described in U.S. Pat. No. 4,502,422, issued Mar. 5, 1985. Piston 10 is cylindrical about axis 12 and comprises a bowl-shaped combustion chamber wall 14 and a sidewall 16. Machined in sidewall 16 is a plurality of annular grooves 18, 20, 22 and 24 for receiving each a compression ring and grooves 26 and 28 for receiving each an oil ring, which grooves encircle piston body 10.

Piston body 10 is manufactured by casting iron to form a blank corresponding roughly in size and shape to the product. The blank is machined to precisely define sidewall 16 and the grooves. The blank is mainly composed of gray iron that satisfies ASTM A48 specification. The gray iron comprises, by weight, 2.9 to 3.35 percent carbon, 0.6 to 0.9 percent manganese, 1.6 to 2.1 percent silicon, 0.15 percent maximum phosphorus, 0.12 percent maximum sulfur, 0.45 percent maximum chromium, 0.4 to 0.6 percent molybdenum, 0.2 to 0.6 percent copper, 0.6 to 1.2 percent nickel, 0.1 percent maximum vanadium, and the balance essentially iron. The gray iron features an as-cast microstructure comprising graphite flakes dispersed within a pearlite matrix.

Compression ring groove 18 is the top groove nearest combustion chamber wall 14. Referring to FIG. 2, groove 18 is defined by opposed faces 32 and 34 in spaced, parallel relationship perpendicular to axis 12 and an end face 36 spaced radially inwardly from sidewall 16. Faces 32 and 34 intersect sidewall 16 at a chamfered circumferential edge 33 and 35. In accordance with this invention, piston 10 is treated to produce a hardened pattern indicated approximately by regions 38 and 40. Hardened regions 38 and 40 encircle piston 10 and include hardened surfaces 42 and 44 that form portions of faces 32 and 34 adjacent sidewall 16. Regions 38 and 40 including surfaces 42 and 44 are characterized by a microstructure comprising a martensite matrix that exhibits a hardness substantially greater than pearlitic microstructure that forms the bulk of piston 10.

Figure 3:
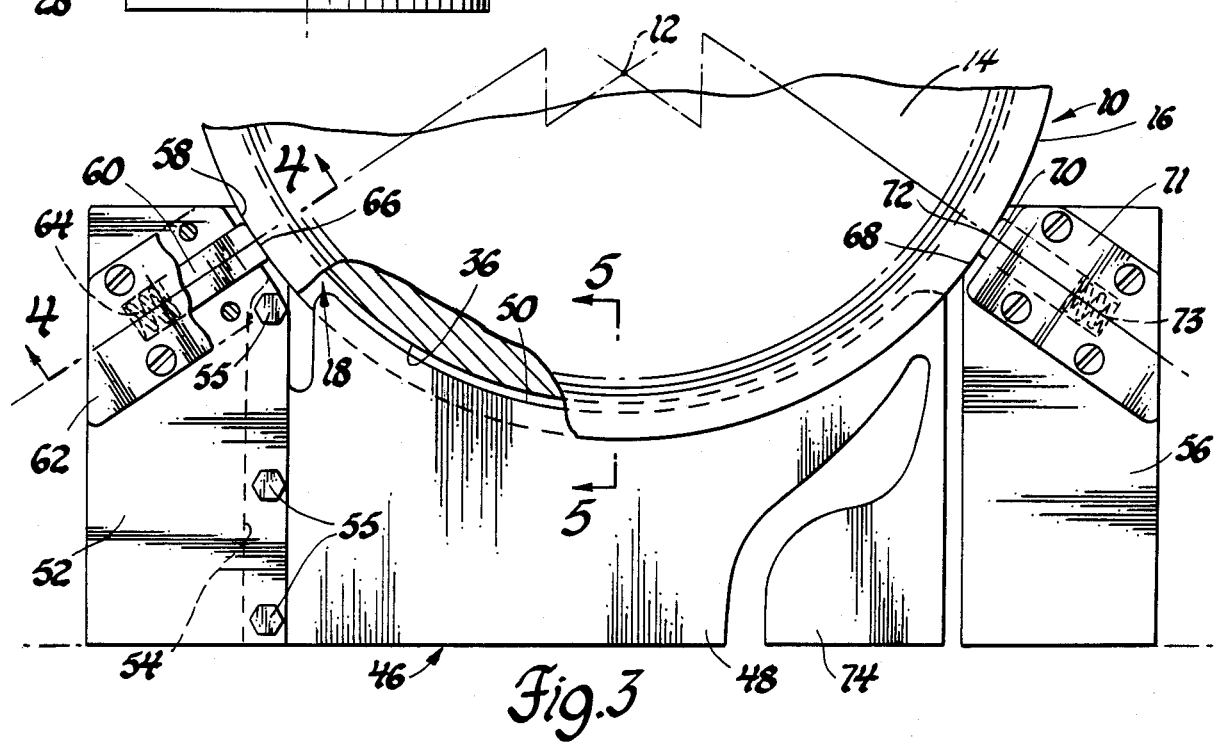
FIG. 3 is an elevational view, partially cut away, showing the piston in FIG. 1 in combination with a preferred groove hardening apparatus.
Figure 4:
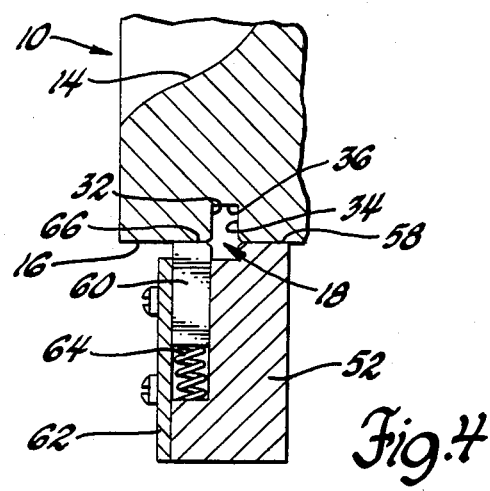
FIG. 4 is a cross-sectional view taken along the line 4—4 in FIG. 3 in the direction of the arrows and showing a detail of an electrical contact between the piston and the hardening apparatus.
Figure 5:
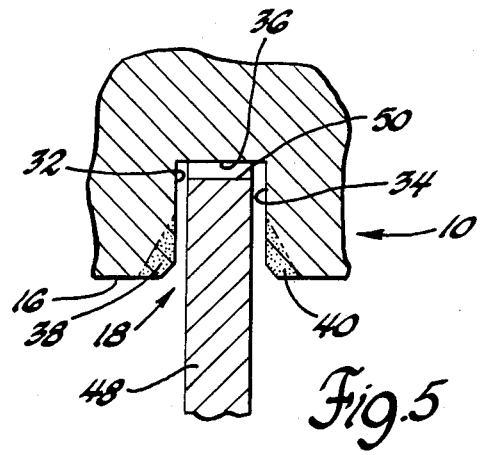
FIG. 5 is a cross-sectional view taken along the line 5—5 in FIG. 3 in the direction of the arrows and showing a detail of the groove in combination with the hardening apparatus.

Piston 10 is preferably treated to form regions 38 and 40 by a stripe hardening process employing an apparatus shown in FIGS. 3 through 5. The apparatus designated generally by 46 in FIG. 3 comprises a metallic proximity plate 48 joined to a first metallic piston support 52 and a separate second, opposite metallic piston support 56. Proximity plate 48 comprises an arcuate edge strip 50 sized and shaped to be received within groove 18 so as to be spaced apart from the faces thereof, as shown in FIG. 5. Proximity plate 48 is received edgewise into a slot 54 of support 52 and secured by bolts 55. The resulting joint electrically connects plate 48 and support 52. Proximity plate 48 also comprises an ogive-shaped electrical lead pad 74 that connects adjacent edge strip 50 at an end remote from support 52. Piston support 56 is located adjacent lead pad 74, but spaced apart therefrom so as to be electrically isolated from plate 48.

Piston support 52 comprises a fixed piston contact 58, better shown in FIG. 4. Support 52 also comprises a piston contact brush 60. Brush 60 is a solid metallic rod slidably mounted in a machined groove and held by a cover plate 62, biased by a spring 64. Brush 60 comprises a piston contact 66. Contacts 58 and 66 feature an arcuate shape corresponding to the curvature of piston sidewall 16. Piston support 56 comprises an arcuate fixed piston contact 68 and a slidable solid brush 70 held by a cover 71, biased by a spring 73 and having an arcuate piston contact 72, in a construction similar to block 52.

Piston supports 52 and 56 are spaced apart to engage a piston sidewall 16 for treatment at circumferentially spaced surface regions. Contacts 58, 66, 68 and 72 are oriented so as to radially face a piston axis 12 and curved to intimately fit against a sidewall 16 at the region of contact. Piston 10 rests upon, and is positioned by, fixed contacts 58 and 68, which abut sidewall 16 adjacent groove surface 34. Contacts 58 and 68 support the piston such that arcuate edge 50 of proximity plate 48 is received within piston groove 18, but spaced apart therefrom, as shown in FIG. 5. In addition, contacts 58 and 68 permit electrical current flow to sidewall 16 adjacent surface 44. Concurrently, piston 10 engages spring-biased brushes 60 and 70 such that contacts 66 and 72 abut sidewall 16 adjacent groove surface 32. Thus, the position of the piston is determined by fixed contacts 58 and 68, while brushes 60 and 70 adjust to assure intimate electrical contact with the piston despite variation in diameter, which variation may be by design, for example, to provide a slight taper to the piston. As better shown in FIG. 4, contacts 58 and 66 thus engage piston sidewall 16 so as to be spaced about groove 18. Similarly, contacts 68 and 72 of support 56 make electrical connection to sidewall 16 spaced about groove 18.

A short term, alternating current electrical pulse is suitably applied between pad 74 of proximity plate 48 and support 56. The resulting electrical circuit comprises proximity plate 48 including arcuate edge strip 50, piston support 52, contacts 58 and 66, piston 10, contacts 68 and 72, and piston support 56. The pulse generates heat within the piston 10, but significant heating is limited to regions 38 and 40 adjacent strip 50, while heating of the remainder of the piston body is negligible. This effect is believed to be a result of resistive heating inductively concentrated in a stripe proximate to strip 50 and is characteristic of stripe hardening. The pulse is applied to heat regions 38 and 40 to a temperature effective to austenitize iron, above about 1450° F. After the pulse, heat rapidly dissipates from regions 38 and 40 into adjacent, cooler regions of the piston body. This self-quenching produces the desired martensitic microstructure in regions 38 and 40, including surfaces 42 and 44.

In the preferred embodiment, proximity strip 50 extends approximately one-fourth the circumference of piston 10. After one quarter section of groove 18 is treated, piston 10 is rotated about axis 12 approximately 90 degrees for treating another quarter section. In this manner, piston 10 is treated in four steps to produce hardened bands 42 and 44 that encircle piston 10. Alternately, piston 10 may be treated in five steps, with the piston being indexed about 72° between steps, to overlap the sections being treated to reduce the care required in positioning the piston and assure treatment of the entire piston circumference.

In a specific example, a cast iron piston having a nine inch outer diameter was stripe hardened in four steps using the described apparatus to produce a hardened groove in accordance with this invention. The groove was 0.194 inch wide between faces 32 and 34 and 0.340 inch deep. The electrical pulse employed to treat each quarter section was about 440 kiloHertz and about 400 volts peak, applied for a time sufficient to austenitize, between about 0.5 and 1.6 seconds. The product hardened surfaces 42 and 44 were approximately 0.140 to 0.170 inch wide and were extended continuously about the piston circumference.

Thus, this invention provides a cast iron piston encircled by a ring groove, the opposed faces of which are selectively hardened adjacent the piston sidewall to reduce ring wear. Gray iron features an as-cast microstructure comprising graphite flakes dispersed within a pearlitic matrix. The hardness was measured by the Knoop hardness test described in ASTM specification E384-84. In the Knoop test, an elongated diamond indentor is pressed into the metal. For the results reported herein, a 200 gram load was applied to the indentor. The indentor is aimed with the aid of a microscope to avoid the dispersed graphite so that the measurements are representative of the matrix metal. The dimensions of the indentation are measured and employed to calculate a hardness number, designated by HK. It is found that the as-cast gray iron has a matrix microhardness generally of less than 320 HK and commonly between 270 and 320 (corresponding approximately to a Rockwell C hardness of 25 to 30). For comparison, the composite hardness value obtained by a Brinnel test is typically between 217 and 262.

When gray iron is austenitized and rapidly cooled, as by self-quenching, the matrix transforms to martensite phase. This martensite matrix is substantially harder than the as-cast pearlite phase. This rapid heating and quenching has a negligible effect upon the dispersed graphite flakes. Thus, the Knoop test is again employed to determine hardness of the matrix, while avoiding the graphite flakes. In accordance with this invention, the treated groove surface exhibits a hardness of at least 600, and preferably at least 690 HK. In general, for the described gray iron, the treated groove surface exhibits a hardness within the range of 690 to 760 HK (corresponding roughly to a Rockwell C hardness of 58 to 61). This hardened material resists wear by a compression ring seated within the groove. It is a significant feature of this invention that the groove surface is hardened adjacent the piston sidewall, where the groove is more susceptible to ring wear. Thus the hardened surface in accordance with this invention is particularly effective to extend the life of the piston.

In the described embodiment, top ring 18 adjacent combustion chamber-defining wall 14 is selectively hardened to extend piston life. Top ring 18 is referred to as the fire ring and is exposed to hotter temperatures and heavier gas loads upon the compression ring seated therein, which increases the susceptibility to ring wear. In accordance with a preferred embodiment comprising a piston having a plurality of ring grooves, the piston of this invention is preferably provided with a selectively hardened top ring. Optionally, other compression ring grooves of the piston may also be hardened, as also may be the oil ring grooves, although oil ring groove wear is not typically a sufficient concern to require hardening. Also, in the described embodiment, the intersection of the groove face and the sidewall is chamfered to remove burrs. Although this invention is not limited to a chamfered groove, chamfering is preferred to help avoid overheating at the edge that may result in melting.

While this invention has been set forth in terms of certain embodiments thereof, it is not intended to be limited to these embodiments but rather only to the extent set forth in the claims that follow.

The embodiments of the invention in which an exclusive property or privilege is claimed are defined as follows:

1. A long-lasting cast iron piston body for an internal combustion engine, said piston body comprising a generally cylindrical sidewall and having an annular groove in said wall encircling said body for receiving a piston ring, said groove being defined by opposed faces that intersect the wall, said piston body being composed predominantly of gray iron characterized by an as-cast pearlitic microstructure, each said groove face comprising an integrally cast, selectively hardened iron band adjacent the piston sidewall and encircling the piston body, said band being characterized by a martensitic microstructure substantially harder than said pearlitic microstructure and effective to reduce wear resulting from a piston ring seated within said groove.

2. A long-lasting cast iron diesel engine piston comprising a generally cylindrical sidewall, a combustion chamber-defining end wall, and a plurality of annular grooves in said sidewall encircling said body for receiving each a piston ring, said grooves comprising a selectively hardened groove proximate to said combustion chamber-defining wall and defined by opposed faces that intersect the sidewall, said piston being composed predominantly of gray iron characterized by an as-cast microstructure comprising a pearlite matrix having a Knoop hardness value less than 320, each said groove face comprising an integrally cast, selectively hardened wear-resistant iron surface portion adjacent the piston sidewall and encircling the piston, said surface portion being characterized by a microstructure comprising a martensite matrix having a Knoop hardness value greater than about 690, said hardened surface portion resisting wear by a piston ring received within said groove during diesel engine operation.

* * * * *